United States Patent [19]

Bouder

[11] 4,033,199
[45] July 5, 1977

[54] TOE CLIP FOR PEDALS

[75] Inventor: Paul C. Bouder, Soisy sur Montmorency, France

[73] Assignee: Etablissements Poutrait-Morin, France

[22] Filed: Nov. 17, 1975

[21] Appl. No.: 632,792

[30] Foreign Application Priority Data

Nov. 19, 1974 France .............................. 74.38016

[52] U.S. Cl. .............................. 74/594.6; 74/594.5
[51] Int. Cl.² ......................................... G05G 1/14
[58] Field of Search ...................... 74/594.6, 594.5; D12/125

[56] References Cited

FOREIGN PATENTS OR APPLICATIONS

| 877,480 | 12/1942 | France ............................ 74/594.6 |
| 107,460 | 3/1899 | Germany ......................... 74/594.6 |
| 26,793 | 7/1907 | United Kingdom .............. 74/594.6 |

*Primary Examiner*—Samuel Scott
*Assistant Examiner*—Randall Heald

*Attorney, Agent, or Firm*—Diller, Brown, Ramik & Wight

[57] ABSTRACT

A toe clip for the pedals of bicycles or other pedal vehicles. The toe clip is formed from a flat cutout metal blank which is suitably bent to form the usual toe receiving space between the toe supporting portion and a turned back portion. For fastening the toe clip to any of various types of pedals, for common road bicycles or for racers, the toe clip is provided with side panels which are bent downward at right angles to the toe supporting portion, these panels forming gusset plates for strengthening the connection of the toe clip to its pedal. Extending from one side of each gusset plate is an apertured fastening lug which may be bent inwardly or outwardly at right angles to the gusset plates or left in the plane thereof, depending on what type of pedal the toe clip is to be fitted. The rear bearing edges formed on the gusset plate bear against the longitudinal face of the pedal frame on which the toe clip is mounted.

9 Claims, 6 Drawing Figures

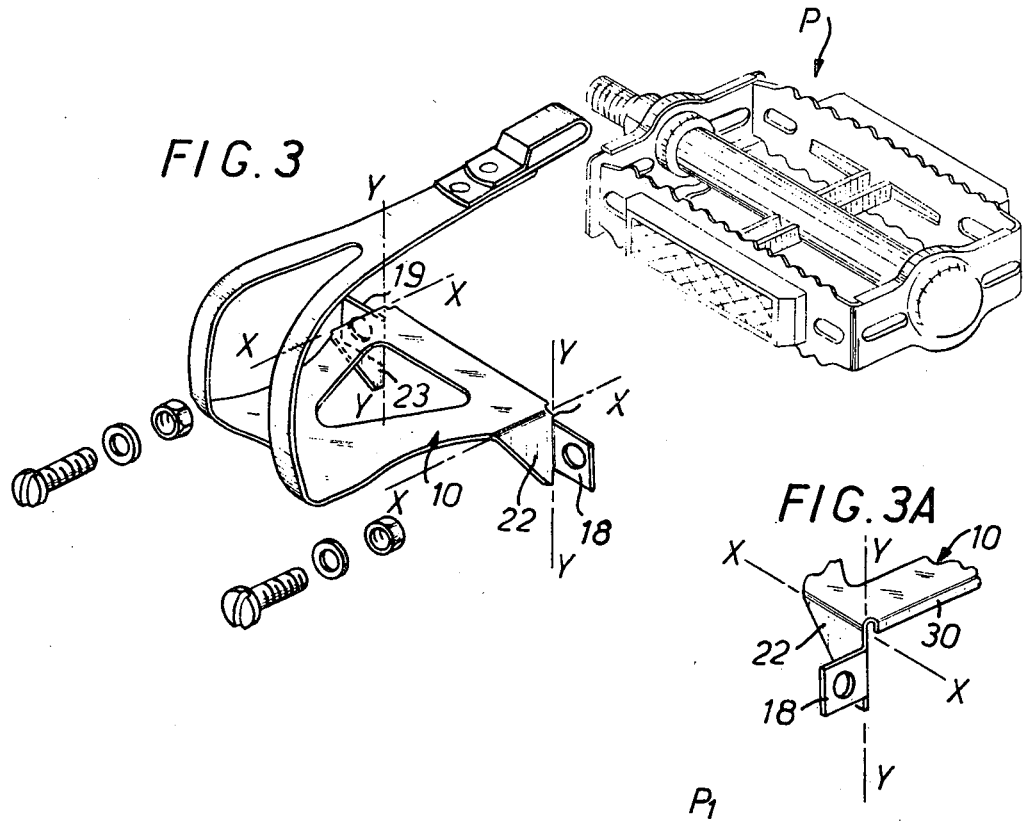
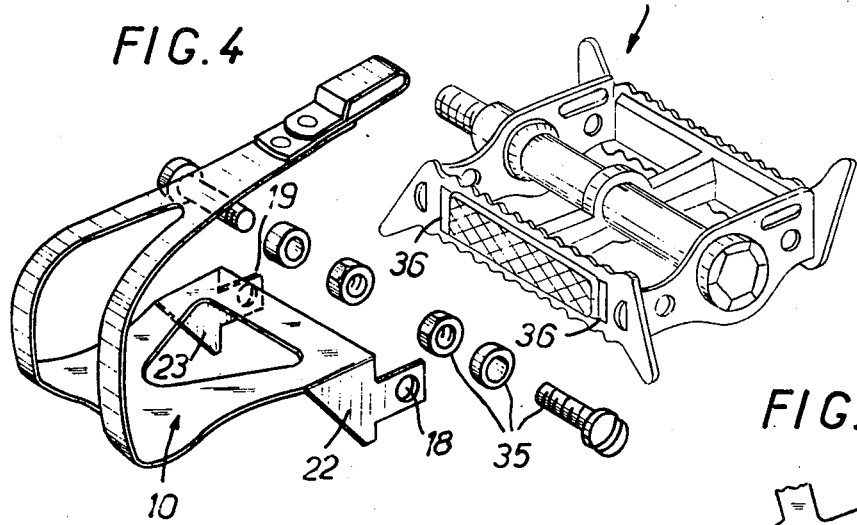
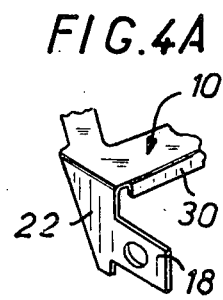

TOE CLIP FOR PEDALS

The present invention relates generally to a toe clip for pedals for bicycles or other similar pedal vehicles.

It is known to construct such pedals with two opposed longitudinal supporting portions and two opposed lateral portions constructed and arranged to form a pedal frame which is mounted for rotation about a spindle which is received in the lateral portions thereof.

There are two general types of pedals in general use in Europe, those used on racers and those used on common road bicycles, the latter have longitudinal supporting surface portions longer than those of racer pedals.

With a view to improving the rider's safety certain types of pedals for bicycles and other pedal vehicles have been equipped with glass reflector strips which improve the visibility of such bicycles or pedal vehicles at night, particularly in areas where the streets or roads lack lighting or are poorly lighted.

The reflecting surfaces of the reflectors in certain cases, particularly on racer pedals, take up the major part of the outer surfaces of each of two longitudinal faces or portions of the pedal frame of the pedals on which they are fitted.

Likewise, it is advantageous to provide such toe clips with two lugs to bring them flush with the associated longitudinal face of the pedal frame joined thereto by nuts and bolts.

Generally, the fastening lugs are formed by bending rear panels behind the toe supporting portion, downwardly at right angles thereto, so that the lines about which the lugs are bent are parallel to the spindle about which the pedal rotates.

Regardless of the type of pedal, be it for a racer or a common road bicycle, it has been found that current toe clips do not give full satisfaction, particularly from the point of view of service life.

This shortcoming results from the structure of the means securing the toe clip to the pedal, particularly the bending of the fastening lugs.

In fact the forces exerted on the toe supporting surface of the toe clip are transmitted to the fastening lugs through the bend lines of the lugs to the associated longitudinal face of the pedal frame.

Now, in such toe clips the forces between the fastening means and the toe supporting surfaces are transmitted by areas of substantially reduced strength, i.e. the lines about which the lugs are bent. It therefore follows that these areas do not provide adequate mechanical strength compared to the forces exerted and transmitted, thereby increasing the potential of fracture of the toe clip at these bend lines.

An object of the present invention is to overcome the above described drawback.

According to a more particular object of the invention a toe clip for use on the pedal of a bicycle or an other pedal vehicle of the type having a pedal frame mounted for rotation about a spindle and having opposed longitudinal and lateral faces, said toe clip comprising a toe supporting portion for supporting the fore end of the rider's foot, a turned back portion continuing beyond the toe supporting portion and generally overlying the foot supporting portion for receiving the rider's toe fastening lugs adapted to be urged flush against one of the longitudinal faces of the pedal frame, reinforcing gusset plates downwardly depending from the sides of the said toe supporting portion and perpendicular thereto, said fastening lugs extending from said gusset plates.

With such gusset plates which are advantageously provided by bending a starting blank at right angles the mechanical strength of the toe clips is substantially reinforced at its junction with the pedal, not only because of the presence of the gussets themselves, but also because of a rear edge thereof forms a bearing edge cooperating with the longitudinal face of the pedal frame on which the toe clip is mounted.

Toe clips according to the invention may be fitted to the pedals of a racer or ordinary road bicycle which pedals may be fitted with glass reflector strips on each of the longitudinal faces of the pedal frame.

In fact in case the toe clip is intended to be fitted on a pedal without a reflector, be it a racer or a road bicycle pedal, the fastening lugs are extended beyond the rear bearing edge of the gusset plates and bent inwardly at right angles, that is, towards each other, so that they can be brought flush against the faces of the longitudinal face of the pedal frame to which it is to be fixed by nuts and bolts.

In case the toe clip is intended to be fitted on an ordinary road bicycle pedal with a reflector strip on the longitudinal faces of the pedal frame the fastening lugs are preferably bent outwardly at right angles so that the inner faces of the gusset plates are adapted to pass parallel to the ends of the reflector strip on the associated longitudinal face of the pedal frame whereas the fastening lugs are adapted to be fixed to the pedal frame beyond the ends of the reflector strip.

However, it is also possible to conceive of a toe clip having a cross or transverse dimension which will be substantially equal to the length of the longitudinal faces of pedal frame in which case the fastening lugs are to be bent inwardly, and not outwardly, as in the previous case, so that the free edges of the lugs are in the immediate vicinity of the ends of the reflector strip.

In case of the pedals of a racer with an integral reflector strip the fastening lugs are not bent but are simply disposed in the plane of their respective gusset plates.

In case of fixing a toe clip to a racer pedal, one of the longitudinal faces of the pedal frame is provided with slots beyond, but adjacent to, the ends of the reflector strip for receiving the lugs which are then parallel to the lateral faces of the pedal frame and fastened thereto by nuts and bolts.

As it will be readily understood, the toe clip according to the invention may, depending on requirements, be fitted to any kind of racer or road bicycle with or without reflector strips on the longitudinal faces of the pedal frame and formed from a single metal blank since the orientation of the fastening lugs alone will adapt the toe clip to various types of pedals. To this end the fastening lugs may be considered to be selectively orientable, i.e., they may be bent to one of two mutually perpendicular positions or simply left in the plane of their respective gusset plates.

In all cases the mechanical strength of the toe clips according to the invention will be substantially reinforced at the junction of the toe clip with its pedal owing to the gusset plates and the rear bearing edges defined by the same. Other features and advantages of the invention will become apparent from the description of the invention which follows by way of example with reference to the accompanying drawings in which:

FIG. 3 is a perspective view of a toe clip also formed from the blank of FIG. 1, with the lugs bent outwardly;

FIG. 3A is a detail view from the rear of the toe clip of FIG. 3;

Figure 1:
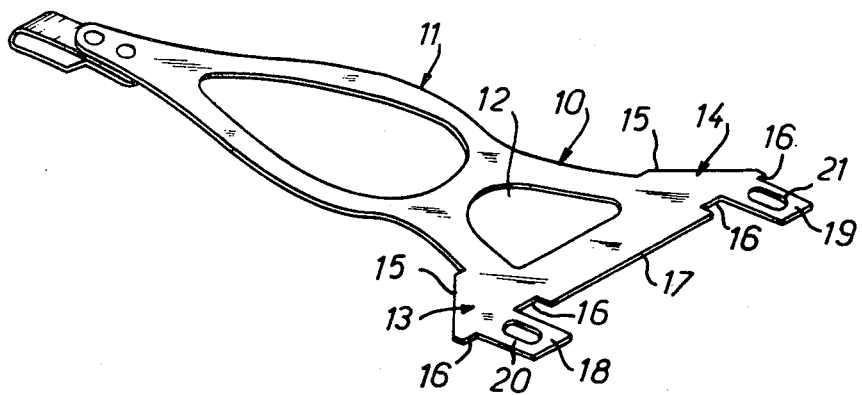
FIG. 1 is a perspective view of a cut out metal blank for a toe clip according to the invention.

FIG. 4 is a perspective view of a toe clip with pedal also formed from the blank of FIG. 1, with the lugs in the planes of their respective gusset plates; and FIG. 4A is a detail. In order to make a toe clip according to the invention a plate of metal is cut out to form a blank with a loop of metal riveted to the forward end thereof (see FIG. 1) this closed loop of metal being adapted to receive a string which is run around the breadth of the rider's foot and through the associated pedal as in common practice. The metal blank is substantially cut out interiorly to reduce its weight as much as possible and includes a cut out toe supporting portion 10, forwardly of the toe supporting portion 10 another cut out portion 11 which is adapted to be turned back so that the rider's toe may be received between the portions 10 and 11, and to the rear and the sides of the toe supporting portion 10 are panels for fastening the toe clip to its associated pedal.

The toe supporting portion 10 has a central opening 12 for reducing the weight of the toe clip: two side panels 13, 14 form the reinforcing gusset plates and the fastening lugs, as will be described hereinbelow.

The side panels 13, 14 are cut out with inclined forward edges 15 and rear edges 16, the central rear edge 17 of the toe supporting portion being disposed farther back than the side rear edges 16.

The side panels 13, 14 are thus cut out to form the fastening lugs 18 and 19, with apertures 20 and 21, extending from the gusset plates 13, 14.

With such a blank there are a several possibilities of affixing the toe clip, as will be described hereinafter.

As the forming of the portion 11 into an open loop for receiving the rider's toe is conventional, it need not be described here, only the various possibilities of fastening the toe clip to the pedal need be described in detail.

Figure 2:
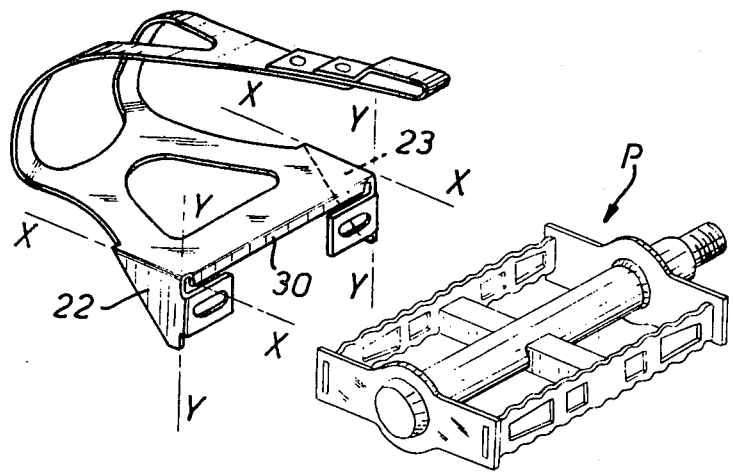
FIG. 2 is also a perspective view of a toe clip formed from the blank shown in FIG. 1, with lugs bent inwardly.

According to a first embodiment for a toe clip for a pedal without reflectors, along the longitudinal faces of the pedal frame (FIG. 2) the side panels 13, 14 are bent downwardly at right angles about the lines X —X, that is, away from the open loop, for receiving the rider's toe. By bending the side panels 13, 14 the reinforcing gusset plates 22, 23 are formed.

The fastening lugs 18, 19 can then also be bent at right angles towards each other, inwardly, about the lines Y —Y, the depending rear edge 30 is formed by the bending of the central rear edge 17 of the toe supporting portion downwardly.

In this way two fastening lugs 18, 19 are provided, which are extensions of the gusset plates 22, 23 and which may be mounted flush with one of the longitudinal faces of the pedal frame of the pedal P by any suitable securing means, e.g. nuts and bolts.

It should be noted that the rear edges 16 of the side panels 13, 14 constitute bearing edges adapted to cooperate with the longitudinal face of the pedal frame on which the toe clip is mounted.

As it will be readily realized, the fastening lugs are not, as in prior art toe clips, obtained by bending panels extending beyond the rear edge of the toe supporting portion parallel to the general axis of the pedal, but are defined as extensions from the two reinforcing gusset plates which are bent perpendicular to the axis of the pedal.

In case the toe clip is intended to be fitted on a road bicycle pedal, as can be seen in FIGS. 3 and 3A, with reflectors provided on the longitudinal faces of the pedal frame, the fastening lugs 18, 19 are not bent inwardly about lines Y—Y but outwardly in order to be secured to the associated longitudinal face of the pedal frame, the bearing edge of the gusset plates extend along the ends of the rectangular reflector strip on the longitudinal face and the depending edge 30 extends along the longer dimension of the longitudinal face of the pedal frame; the bearing edges and depending edges are coplanar.

When the toe clip is intended to be fitted on a racer pedal $P_1$ having reflector strips along the longitudinal faces of the pedal frame, as clearly shown in FIGS. 4 and 4A, (such pedals having bearing surfaces which are shorter in longitudinal extent than those of the road bicycle pedal described above), the fastening lugs 18, 19 are not bent but remain in the plane of the gusset plates 22 and 23.

The fixing of the toe clip on such a pedal is effected by means of bolt, washer and nut assemblies 35, fixing fastening lugs 18, 19 with the lateral faces of the pedal frame.

For this purpose each longitudinal face of the pedal frame is provided with two vertical slots or apertures 36 immediately adjacent to the short ends of the rectangular glass reflector strip for receiving the fastening lugs 18, 19, the bearing edges 16 of the gusset plates abutting transversely across the longitudinal face of the pedal frame.

As it can be easily understood, the starting blank therefore not only makes a toe clip which is of substantially reinforced mechanical strength at the junction with the pedal but also provides a toe clip which is readily adaptable to different types of pedals with and without reflector strips along the longitudinal faces of the pedal frame simply by suitably orienting the fastening lugs by bending.

The invention is obviously not limited to the illustrated and described embodiments but encompasses all variations and modifications within the scope of the appended claims.

What I claim is:

1. Toe clip for bicycle pedals or other similar pedals of the type including a pedal frame mounted for rotation about a spindle, the pedal frame having a pair of opposed longitudinal faces for supporting the rider's foot and a pair of opposed lateral faces, said toe clip comprising a toe supporting portion for supporting the fore end of the rider's foot, a turned back portion continuing beyond one end of said toe supporting portion and thereabove for defining a toe receiving space therewith, wherein the improvement comprises reinforcing gusset plate means downwardly depending from the lateral sides of said toe supporting portion and remote from said turned back portion, said gusset plate means being oriented substantially perpendicular to the toe supporting portion, and fastening lugs extending from said gusset plate means adapted to brought flush against at least one face of the pedal frame.

2. Toe clip according to claim 1, wherein said fastening lugs are initially selectively orientable to any of three distinct positions.

3. Toe clip according to claim 1, wherein said toe supporting portion is formed as a one-piece bent, sheet metal construction with said gusset plate means and said fastening lug.

4. Toe clip according to claim 1, wherein said gusset plate means are provided with rear bearing edges adapted to abut against one of the longitudinal faces of the pedal frame on which it is to be mounted.

5. Toe clip according to claim 4, wherein the rear edge of the toe supporting portion is adapted to bear against the one longitudinal face of the pedal frame and is coplanar with said rear bearing edges of said gusset plate means.

6. Toe clip according to claim 1, wherein said fastening lugs are bent at right angles to the planes of their respective gusset plate means and inwardly towards each other, said fastening lugs being adpated to be brought flush with one of the longitudinal faces of the pedal frame on which the toe clip is to be mounted.

7. Toe clip according to claim 1, wherein said fastening lugs are bent at right angles to the planes of their respective gusset plate means and outwardly away from each other, said fastening lugs being adapted to be brought flush against one of the longitudinal faces of the pedal frame on which the toe clip is to be mounted.

8. Toe clip according to claim 1, wherein said fastening lugs are disposed in the same planes as their respective gusset plate means, said fastening lugs being adapted to be brought flush with the lateral faces of the pedal frame.

9. Toe clip according to claim 1, wherein said rear bearing edges on said gusset plate means are disposed to each side of each said fastening lugs.

* * * * *